Sept. 6, 1966  P. L. HURST  3,270,430
EDUCATIONAL AID

Filed Dec. 24, 1963  2 Sheets-Sheet 1

Patricia L. Hurst
INVENTOR.

BY
Attorneys

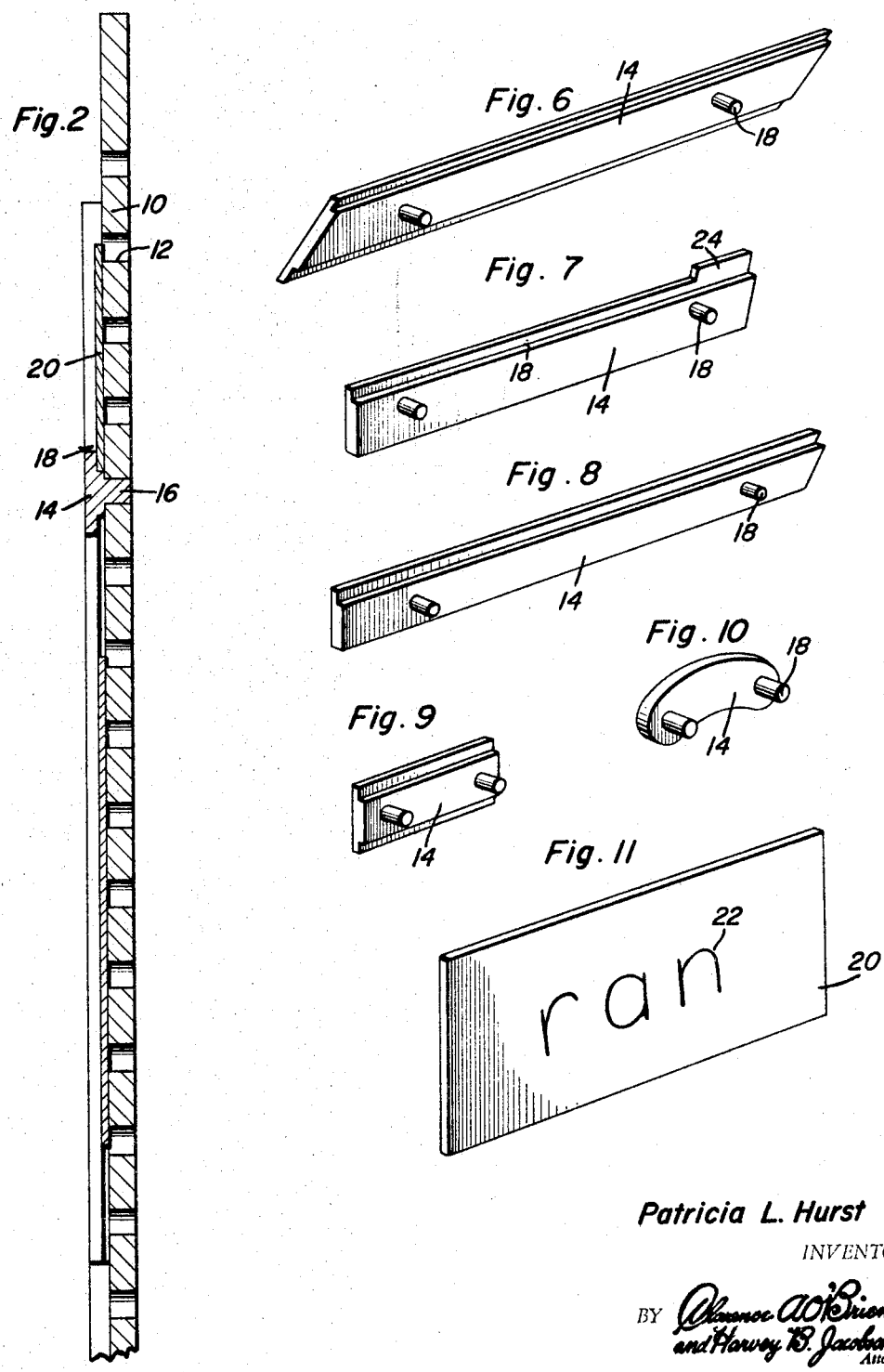

United States Patent Office 3,270,430
Patented Sept. 6, 1966

3,270,430
EDUCATIONAL AID
Patricia L. Hurst, 225 Clifton St., Oakland, Calif.
Filed Dec. 24, 1963, Ser. No. 333,079
6 Claims. (Cl. 35—35)

The present invention generally relates to an educational aid and more particularly to an educational visual aid primarily intended to be employed in teaching sentence structure. Specifically, the present invention is an educational aid for use in teaching or studying sentence diagramming and visually aids in the understanding of sentence diagramming by demonstrating somewhat in a pictorial manner, the actual sentence diagram in a classroom or the like with the device being sufficiently large to enable visual demonstration to a group of students with the device being used by the teacher or instructor or by the students.

An object of the present invention is to provide a visual educational aid for use in teaching or studying sentence diagramming for use in a classroom by a teacher or students for effectively visually demonstrating various aspects of sentence diagramming thereby rendering this procedure more understandable to the students.

Another object of the present invention is to provide an educational aid in accordance with the preceding object which is simple in construction, easy to use, effective for visually demonstrating sentence diagramming and relatively inexpensive to manufacture.

Still another feature of the present invention is to provide an educational aid having a background panel with perforations orientated therein together with a plurality of various shaped and sizes of bars or strips having pegs thereon for detachable reception in the perforations in the background panel whereby the strips may be assembled in a particular manner for diagramming a sentence with each of the strips also including a recess in the edge thereof for receiving a card having word indicia thereon for indicating the words of a sentence being diagrammed thereby further demonstrating visually the significant factors relating to sentence diagramming.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical, sectional view taken substantially upon a plane passing along section line 2—2 on an enlarged scale, of FIGURE 1 illustrating the structural details of the invention;

FIGURE 6 is a rear perspective view of another form of strip;

FIGURE 7 is a rear perspective view of another form of strip;

FIGURE 8 is a rear perspective view of another form of strip;

FIGURE 9 is a perspective view of another form of strip;

FIGURE 10 is a perspective view of another form of strip; and

FIGURE 11 is a perspective view of one of the cards employed in the present invention.

Figure 1:
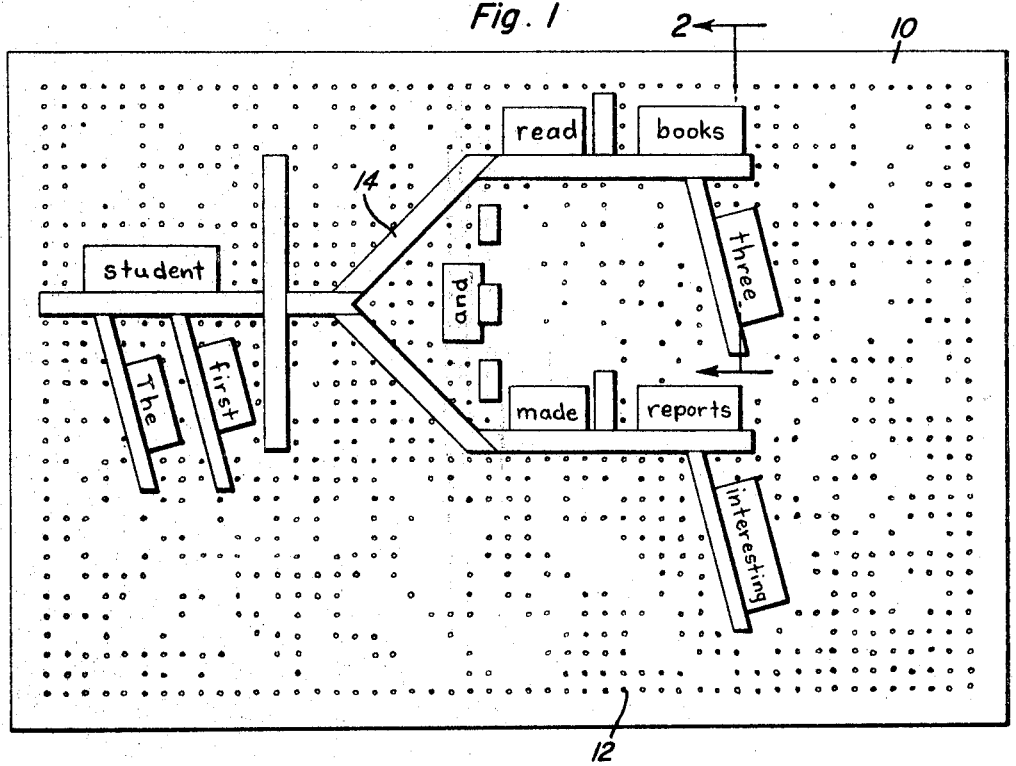
FIGURE 1 is a plan view of the educational aid of the present invention illustrating a sentence diagram disclosed in position thereon.
Figure 3:
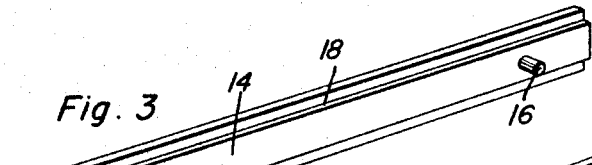
FIGURE 3 is a rear perspective view of one form of strip employed in the present invention.
Figure 4:
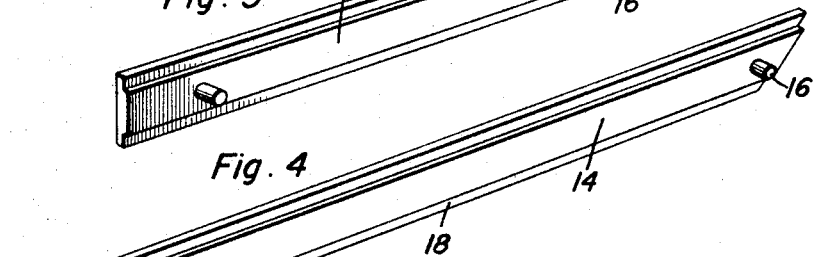
FIGURE 4 is a rear perspective view of another form of strip.
Figure 5:
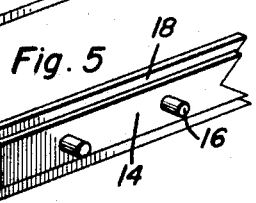
FIGURE 5 is a rear perspective view of another form of strip.

Referring now specifically to the drawings, the educational aid of the present invention includes a rectangular perforated panel 10 having relatively small openings or perforations 12 formed therein in a regular pattern forming vertical and horizontal rows of apertures or perforations 12. The panel or background board 10 is painted any suitable color such as white or the like and may be constructed of any suitable material such as Masonite or any other hard board material capable of retaining the perforations 12 in their original size. A wood frame may be provided on the background panel or board 10 which may also be painted white similar to the panel 10.

While sizes are variable depending upon the manner of use of the invention, it has been found that the background board or panel 10 may conveniently be 2½ feet wide and 4½ feet long with the perforations 12 being ³⁄₁₆ of an inch in diameter with the perforations located one-half inch apart vertically and horizontally. As aforestated, the dimensions may vary as may the material from which the background board 10 is constructed.

A plurality of strips generally designated by numeral 14 are mounted on the background board 10 and the strips are imperforate and are constructed of various lengths and various shapes and configurations as illustrated in FIGURES 3–10 respectively. The strips 14 may also be constructed of Masonite or any other similar material and each of the strips 14 includes projecting pegs 16 on the back side thereof for reception in the perforations 12 with the pegs being rigidly or integrally formed with the strips 14 and having a diameter slightly less than the diameter of the perforations 12 for ease of insertion thereof. There are two types of diagram strips with the basic strips indicating the subject, verb line or lines being an inch wide and colored black or any other significant color with the other strips being modifying strips or lines such as adjectives, adverbs, prepositional phrases and the like which are one-half inch wide with the modifying strips coming in two sets with one set containing modified lines painted black and the other set containing duplicate lines painted red with the red set being used to emphasize different parts of the diagram as it is being studied.

Also, the diagram strips 14 have longitudinal recesses 18 in each rear edge thereof for insertion of and receiving laminated word cards 20 having indicia 22 thereon so that the linear edges of the cards 20 may be received in the grooves or recesses defined by the strips 14.

The laminated word cards 20 may offer a variety of words representing all eight parts of speed and different sentences can be constructed from these words thereby facilitating use of the invention by teachers and students.

The angular orientation of the ends of the various strips 14 may be varied for enabling orientation of certain of the strips in angular relation to each other. The strip 14 illustrated in FIGURE 3 has ends that are perpendicular to the longitudinal axis thereof while the strip illustrated in FIGURE 4 has the ends thereof inclined in opposite relation to each other. The strip illustrated in FIGURE 5 has one end formed substantially with a V-shaped notch and the other end being transversely flat. The strip illustrated in FIGURE 6 has both ends thereof inclined in the same direction. The strip illustrated in FIGURE 7 has an offset portion 24 at one end thereof while the strip in FIGURE 8 has one perpendicular end and one inclined end and the strip in FIGURE 9 is relatively short while the strip in FIGURE 10 is arcuate in configuration. The strips in FIGURES 7 and 8 have grooves in only one edge thereof and the strip in FIGURE 10 has no grooves. The strip in FIGURE 9 represents a conjunction and corresponds to the conjunction marks in a sentence diagram. Any part of the sentence that is compound has to be connected by a conjunction. The strip in FIGURE 10 represent parenthesis which are required to diagram a command sentence when the subject is understood and not written into the sentence. An example of such a sentence is, "Hit the ball." and the subject is understood to be "you."

As illustrated in FIGURE 1, the sentence "The first student read three books and made interesting reports." It is pointed out that all adjective strips or lines are narrower and distinguishably colored.

In use, the various words forming components of the sentence diagram are placed in overlying relation to the strips so that the strips and words making the sentence structure in the diagram will be visually observed by students. Having a particular sentence, the strips may be orientated in a particular pattern for indicating the sentence diagram and the laminated cards with the words thereon are inserted into overlying relation to the strips so that the words designated by the strips and their relationship to the other words in the sentence diagram will be visually indicated and more easily understood. The educational aid of the present invention is also useful in diagramming foreign languages for use in instructing students in such languages.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An educational aid for visually demonstrating sentence diagramming comprising a panel having a plurality of symmetrically arranged perforations therein, a plurality of strips of elongated relatively narrow construction for illustrating the components of a sentence diagram, each of said strips having a pair of projecting pegs on the back surface thereof for reception in the perforations of the panel, a plurality of cards having words thereon for use as various components of a diagrammed sentence oriented above the strips for illustrating the words forming the sentence components designated by the strips, each of said strips having a longitudinal recess on the inner surface thereof forming a groove when combined with the panel for receiving the linear edge of one of the cards.

2. The structure as defined in claim 1 wherein the ends of certain of the strips are orientated in angular relationship to abuttingly engage adjacent strips for indicating the relative position of various words in a sentence being diagrammed.

3. The structure as defined in claim 2 wherein certain of said strips are wider than the other strips and being painted a distinguishable color from the panel to indicate the relative significance of certain words in a diagrammed sentence.

4. An apparatus for visually demonstrating the procedures in diagramming a sentence comprising an enlarged rectangular background panel having a colored surface and including a plurality of symmetrically arranged perforations orientated in vertical and horizontal rows, a plurality of strips being colored a readily distinguishable color for mounting on the panel in various orientations when diagramming a sentence, each of said strips having a plurality of projecting pegs on one surface thereof orientated in the same or a multiple of the spatial relationship of the perforations for reception therein, certain of said strips having angulated end portions for abutting engagement with other of the strips in angular orientation, each of said strips having a recess in at least the upper edge thereof forming a groove when associated with the panel, and a plurality of word cards received in the grooves for mounting the word cards in overlying relation to the strips thereby indicating the words in the sentence diagram and their relative positions.

5. In an educational aid for visually demonstrating the procedures in diagramming a sentence, an enlarged background panel having a plurality of symmetrically arranged perforations therein, and a plurality of strips which are relatively elongated and relatively narrow for mounting on the panel in various orientations when diagramming a sentence, each of said strips having a plurality of projecting pegs on one surface thereof orientated in the same or a multiple of the spatial relationship of the perforations for reception therein thereby detachably mounting the strips in position on the panel, each of said strips having a longitudinal recess in at least the upper inner corner edge thereof forming a groove when associated with the panel, at least one word card disposed in said groove above the strip, said strips being distinguishable from the panel for enabling observance thereof and for indicating relative significance of certain components in a sentence being diagrammed.

6. For use in an educational aid for visually demonstrating the procedures in diagramming a sentence by employing a plurality of word cards having the words of the sentence printed thereon, the combination of an enlarged background panel having a planar surface and a plurality of symmetrically arranged socket forming recesses therein, and a plurality of strips which are relatively elongated and relatively narrow for mounting on the panel in various orientations when diagramming a sentence, each of said strips having a plurality of projections on one surface thereof orientated in the same or a multiple of the spatial relationship of the socket forming recesses for reception therein thereby detachably mounting the strips in position on the panel, each of said strips having a longitudinal recess throughout the length of the upper inner corner thereof for defining an upwardly opening groove when associated with the panel for removably supporting a selected word card when the word card is disposed above the strip and against the surface of the panel, said strips being visually distinguishable from the panel for enabling easy observance thereof and designating relative significance of certain components of a sentence being diagrammed, said strips also being readily disinguishable from each other for further indication of the relative significance of certain components of a sentence being diagrammed.

References Cited by the Examiner

UNITED STATES PATENTS 2,520,649 8/1950 Northrop _____ 35—35
3,039,217 6/1962 Stefanakis _____ 40—152

FOREIGN PATENTS 608,350 9/1948 Great Britain.

EUGENE R. CAPOZIO, *Primary Examiner.*

LAWRENCE CHARLES, *Examiner.*

WILLIAM GRIEB, *Assistant Examiner.*